United States Patent [19]

Hagman et al.

[11] Patent Number: 4,520,169

[45] Date of Patent: May 28, 1985

[54] ELASTOMERIC SOL/GEL BLENDS

[75] Inventors: John F. Hagman; Chi-Kai Shih, both of Wilmington, Del.

[73] Assignee: E. I. Du Pont de Nemours and Company, Wilmington, Del.

[21] Appl. No.: 414,451

[22] Filed: Sep. 2, 1982

[51] Int. Cl.[3] .................. C08L 13/00; C08L 23/34
[52] U.S. Cl. .................... 525/185; 525/190; 525/259
[58] Field of Search ............. 525/190, 259, 194, 185

[56] References Cited

U.S. PATENT DOCUMENTS

| | | | |
|---|---|---|---|
| 3,780,140 | 12/1973 | Hammer | 260/884 |
| 3,873,494 | 3/1975 | Lewis | 260/42.37 |
| 4,275,180 | 6/1981 | Clarke | 525/173 |
| 4,275,181 | 6/1981 | Hoh | 525/189 |

OTHER PUBLICATIONS

Rubber World—"Materials and Compounding Ingredients for Rubber"—1975, p. 92.

*Primary Examiner*—Carman J. Seccuro

[57] ABSTRACT

The processability of an uncured soft elastomer is improved by blending the elastomer under shear conditions with a terpolymer of ethylene with carbon monoxide and with a copolymerizable ethylenically unsaturated monomer in the presence of a crosslinking agent for polymer (T) which does not substantially cure elastomer (E). Gel resulting from crosslinking polymer (T) improves the properties of the blend as compared with the soft elastomer alone. When elastomer (E) and the crosslinking agent for polymer (T) risk undergoing a reaction which would result in substantially crosslinking elastomer (E), one may substitute another soft elastomer ($E_1$) for elastomer (E) to avoid this undesirable result and then blend the resulting composition with elastomer (E).

26 Claims, No Drawings

ELASTOMERIC SOL/GEL BLENDS

BACKGROUND OF THE INVENTION

This invention relates to certain elastomeric blends containing a sol of an uncrosslinked elastomer and a gel of a crosslinked copolymer of ethylene with carbon monoxide and with one or more ethylenically unsaturated monomers copolymerizable therewith.

Many commercial elastomers, for example, ethylene/vinyl acetate copolymers, ethylene/methyl acrylate copolymers, and chlorosulfonated polyethylene are soft and sticky and thus difficult to process in ordinary industrial equipment and, unless specially surface treated or compounded, also difficult to ship or store. It is well known that the processability of soft elastomers may be improved by thoroughly blending them with a gel polymer, for example, a crosslinked elastomer. While blending such different types of elastomers in a latex presents no difficulty, polymer latices are not always available. When blend components are not in latex form, it is not attractive to specially prepare latices having suitable consistencies, to handle the resulting large volumes, and to go through the extra steps of isolating the blend from the latex and drying. However, blending uncured, dry, soft elastomers with dry, cured elastomers is very difficult, so that a good dispersion of one elastomer in the other cannot be obtained.

There is, therefore, a need in the art for a method which would permit effective dry blending of such elastomeric components.

SUMMARY OF THE INVENTION

According to this invention, there is now provided a process for improving the processability of difficultly processable, soft elastomer (E), wherein uncured elastomer (E), 30-99 parts by weight, is blended with a composition selected from the class of compositions (1) and (2), wherein (1) is a mixture, which may be prepared in situ, of uncrosslinked polymer (T), which is a copolymer of ethylene with carbon monoxide and with at least one ethylenically unsaturated monomer X selected from the class consisting of $\alpha,\beta$-unsaturated $C_3$-$C_{20}$ mono- and dicarboxylic acids, $C_1$-$C_{18}$ alkyl esters of $\alpha,\beta$-unsaturated $C_3$-$C_{20}$ mono- and dicarboxylic acids, vinyl esters of $C_1$-$C_{18}$ saturated carboxylic acids, vinyl $C_1$-$C_{18}$ alkyl ethers, acrylonitrile, and methacrylonitrile with an effective amount of a crosslinking agent for polymer (T), which does not substantially cure elastomer (E);

the total amount of polymer (T) plus crosslinking agent being about 1-70 parts by weight; and (2) is a blend of polymer (T) with an effective amount of a crosslinking agent for polymer (T) and with soft elastomer ($E_1$), which is not substantially curable by the crosslinking agent for polymer (T), and which may be the same as elastomer (E); the amount of elastomer ($E_1$) being about 30-99 weight percent of the blend, and the amount of polymer (T) plus crosslinking agent being about 1-70 weight percent, said blend having been prepared under shear conditions, the amount of shear and the temperature being such that the resulting blend has a gel content of about 1-70%, and the gel forms a dispersed phase in a sol matrix;

the amount of blend (2) being about 1-70 parts by weight;

with the proviso that blending of elastomer (E) with composition (1) is carried out under shear conditions, the amount of shear and the temperature being such that the resulting blend has a gel content of about 1-70%, and the gel forms a dispersed phase in a sol matrix.

There also is provided a processable elastomeric composition made by the above process. Definition: For the purposes of this invention, an elastomer is a substance that can be stretched at room temperature to at least twice its original length and, after having been stretched and the stress removed, returns with force to approximately its original length in a short time.

DETAILED DESCRIPTION OF THE INVENTION

In one embodiment of the process of the present invention, the soft elastomer (E), which normally does not cure to a substantial degree in the presence of crosslinking agents for polymer (T), is blended with polymer (T) and with such a selective crosslinking agent under such conditions that polymer (T) is cured either exclusively or preferentially. The resulting dispersion of the gel of cured polymer (T) in the soft elastomer (E) has a much better processability than the soft elastomer (E) alone.

It may happen, however, that the crosslinking agent chosen for polymer (T) also cures or otherwise reacts with elastomer (E) but will not react with another soft elastomer ($E_1$). Under such circumstances, it may be practical to operate according to the second embodiment of this invention, thus first preparing under the same general conditions a well dispersed blend of crosslinked polymer (T) with substantially uncured elastomer ($E_1$), then further blending this composition with soft elastomer (E).

Any uncured elastomer (E) which is too soft or too tacky for normal processing, handling, or storing can be improved according to the process of the present invention. Those elastomers which can particularly significantly benefit by this treatment include, for example, ethylene/methyl acrylate copolymers, ethylene/vinyl acetate copolymers, chlorosulfonated polyethylene, and ethylene/methyl acrylate/monoethyl maleate terpolymers. Suitable polymers (T) are those copolymers described in U.S. Pat. Nos. 2,495,286 to Brubaker and 3,780,140 to Hammer, which are hereby incorporated by reference. The preferred polymers (T), which may be represented by the designation E/X/CO (where E stands for ethylene) will have a melt index of 0.1 to 500 and the respective E:X:CO weight proportions within the following ranges (40–80):(5–60):(3–30). The CO concentration in these polymers can be determined either by infrared or nuclear magnetic resonance spectroscopy in a manner known to those skilled in the art; see, for example, Chapter 4 by J. E. McGrath et al. in *Applications of Polymer Spectroscopy*, edited by E. G. Brame, Academic Press, New York, 1978. These copolymers can be readily made according to the techniques described in the above two U.S. patents, and some are commercially available.

Typical comonomer X may be, for example, acrylic acid, maleic acid, vinyl acetate, methyl acrylate, vinyl propionate, methyl vinyl ether, isobutyl acrylate, diethyl maleate, and acrylonitrile.

The preferred crosslinking agents for polymers (T) are primary diamines; their salts, especially those with organic acids; their precursors such as diamine carbamates, adducts with aldehydes, and various complexes.

Ethylene/vinyl acetate/carbon monoxide terpolymers can also be crosslinked with elemental sulfur. When a primary diamine or its precursor is used, chlorosulfonated polyethylene cannot be directly blended with polymer (T) and the crosslinking agent because both the chlorosulfonyl and sulfonyl groups react with the diamine. The second embodiment of the process of the present invention is feasible, however, and results in a processability improvement. Although in the ideal situation, polymer (T) should be completely crosslinked, while elastomer (E) should remain completely uncured, it is realized that partial crosslinking of elastomer (E) cannot always be avoided and that the final blend may thus contain a small proportion of cured elastomer (E) while a small portion of polymer (T) may remain uncrosslinked. Such departures from the ideal situation fall, nevertheless, within the scope of the present invention so long as polymer (T) becomes substantially crosslinked, while elastomer (E) remains substantially uncured, so that the resulting composition is processable in ordinary industrial equipment.

An effective amount of the diamine crosslinking agent is about 0.01–20 moles/kg of polymer (T), preferably 0.02–8 moles/kg, especially 0.1–2 moles/kg. Suitable primary diamines and their precursors include, for example, hexamethylenediamine, hexamethylenediamine carbamate, hexamethylenediamine adduct with cinnamaldehyde, hexamethylenediamine dibenzoate, dilaurate, or distearate, tetraethylenepentamine, methylenedianiline, methylenedianiline complexes with LiCl or NaCl (in the presence of a small amount of an acid), ethylenediamine, and ethylenediamine carbamate. The preferred crosslinking agent is hexamethylenediamine carbamate, which is available from E. I. du Pont de Nemours and Company under the name "DIAK" No. 1. When this crosslinking agent is used, its amount is preferably about 0.2–2 moles per kilogram of polymer (T).

Ethylene/vinyl acetate/carbon monoxide terpolymers containing about 15–60 weight percent of vinyl acetate and 5–30 weight percent of carbon monoxide, which can be crosslinked with sulfur, are described in U.S. Pat. No. 4,172,939 to Hoh, which is herein incorporated by reference. Generally, the same recipes and the same conditions can be employed as in the conventional sulfur vulcanization of natural rubber and of synthetic, unsaturated elastomers. Instead of elemental sulfur, sulfur donors such as, e.g., thiuram polysulfides and sodium polysulfides can be used. A vulcanization accelerator, e.g., a thiazole, guanidine, thiuram, or dithiocarbamate should be added to increase the rate of crosslinking. The amount of elemental sulfur, when used, will be at least about 0.5 part by weight per 100 parts of polymer (T), and the amount of accelerator will be at least about 0.25 part by weight.

When polymer (T) is ethylene/vinyl acetate/carbon monoxide terpolymer, and a diamine crosslinking agent is used, curing of elastomer (E) can usually be completely avoided because of the high reactivity of polymer (T) toward, the diamine. The preferred amount of this terpolymer is about 5–50% by weight of the elastomer blend.

The temperature of blending polymer (T) with elastomer (E) or ($E_1$) can normally be varied quite broadly, for example within a range of about 30°–200° C., but preferably is maintained at about 100°–150° C. However, when elastomer (E) or ($E_1$) is an ethylene/methyl acrylate/monoethyl maleate terpolymer or another elastomer which has a functional group that may react at elevated temperature with the crosslinking agent, especially with a diamine, it is recommended that the blending temperature be kept below about 120° C. With adequate mixing equipment a blending time of about 1–20 minutes normally is sufficient. Commercial equipment of various types may be used. Internal mixers such as a Brabender "Plasticord" or a Banbury mixer are preferred.

Some of the materials used in the process of this invention are commercial products available, among others, from E. I. du Pont de Nemours and Company. These include, for example, ethylene/vinyl acetate/carbon monoxide terpolymer, ethylene/vinyl acetate copolymer, chlorosulfonated polyethylene, and ethylene/methyl acrylate/monoethyl maleate terpolymer.

This invention is now illustrated by representative examples of certain preferred embodiments thereof, where all parts, proportions, and percentages are by weight unless otherwise indicated. The processability improvement observed for the blends of this invention may manifest itself as higher viscosity and lower die swell than elastomer (E) by itself, or greater collapse resistance. These testing methods are described below:

1. Die swell and Apparent Viscosity

Compounded polymer, 7 g, is charged into the barrel of an Instron Rheometer (Model 3211, Instron Corp., 2500 Washington Street, Canton, Ma.) equipped with a die of 3.2 mm ID, 16 L/D, 180° entrance angle with the barrel set at 100° C. The piston is brought down until a portion of the sample begins to extrude from the bottom of the die. The piston is then stopped and the sample is heated for 5 minutes. The piston is then moved at a rate of 2.5 mm/min for 6 minutes; the force on the piston is recorded and a section of extrudate, approximately 40 mm long, is collected. The apparent viscosity and die swell are calculated by the formula below:

$$\text{die swell \%} = \frac{\text{Average diameter of extrudate (mm)} - 3.2}{3.2} \times 100;$$

apparent viscosity (kPa·s) = 1.015 × (force on the piston in pounds) or 0.228 × (force on the piston in Newtons).

2. Gel Content

A 2.0±0.2 g sample of polymer ($W_1$) is placed in a 100 mL volumetric flask, and enough tetrahydrofuran or other suitable common solvent is added to bring the volume to 100 mL. The common solvent should dissolve all the component polymers in their uncured state but should not degrade the elastomers nor react with the crosslinks, so that the gel portion stays insoluble during the test. The sample is allowed to stand for 20 hours at ambient temperature and is then shaken for 1 hour on a shaker. A 40 mL aliquot of the supernatant is collected and centrifuged for 30 minutes at 17,000 rpm, after which the sample is held at room temperature for 15 minutes. A 25 mL aliquot of the supernatant is removed and evaporated to dryness. After determination of the weight of the dry sample ($W_2$), gel content is calculated by the following formula:

$$\text{gel content (\%)} = \frac{W_1 - 4W_2}{W_1} \times 100$$

3. Collapse Resistance

A sample of compounded polymer is pressed into 76 mm×152 mm×1.9 mm (3"×6"×0.075") slabs by using a 203 mm×203 mm mold with 76×152×1.9 mm cavities. Molding is carried out by pressing at 100° C. for 3 minutes under a load of 13,600 kg and then at room temperature for 5 minutes under the same load. A 25 mm×100 mm×1.9 mm (1"×4"×0.075"), strip is cut from the slab, curled into a ring and stapled together at the point where the two ends meet. The ring is placed in a shallow aluminum pan, stapled edge down. The vertical distance between the top of the pan and the uppermost edge of the sample ($l_0$) is measured. The pan and sample are treated at 93±1° C. for 5 minutes, then cooled to room temperature. The distance between the top of the pan and the uppermost edge of the sample ($l_1$) is again measured. Collapse resistance, defined as % retention of height of the sample ring is calculated by the following formula:

$$\text{collapse resistance (\%)} = \frac{l_1}{l_0} \times 100$$

In all the examples according to the present invention the gel, following crosslinking, formed a dispersed phase in a sol matrix.

The following abbreviations are used in the examples:
E/VA=ethylene/vinyl acetate dipolymer
E/VA/CO=ethylene/vinyl acetate/carbon monoxide terpolymer
E/MA/MAME=ethylene/methyl acrylate/monoethyl maleate terpolymer.
CSPE=chlorosulfonated polyethylene
EPDM=ethylene/propylene/diene terpolymer
E/P/1,4-HD=ethylene/propylene/1,4-hexadiene terpolymer HMDAC=hexamethylenediamine carbamate
DOTG=di(o-tolyl)guanidine
MDA=methylenedianiline
"Santicizer" 409=polyester plasticizer, Monsanto
"Carbowax" 4000=polyethylene oxide, m.w. 4000, Union Carbide
"Naugard" 445=amine antioxidant, Uniroyal The specific uncured elastomers used in the examples are identified by Roman numerals, as follows (all melt indices determined according to ASTM D-1238, condition E):
I E/VA Copolymer ("Vynathene" EY 907), made by U.S. Industries, 60% VA, Mooney viscosity 20 $ML_4$ (212° F., 100° C.)
Ia E/VA Copolymer ("Vynathene" EY 906), made by U.S. Industries, 55% VA, 20 Mooney viscosity $ML_4$ (212° F., 100° C.)
Ib E/VA Copolymer, 40% VA, Melt Index 58
II E/MA/MAME Terpolymer, 54% MA, 4% MAME, Melt Index 9
III E/VA/CO Terpolymer, 66% E, 23.5% VA, 10.5% CO, Melt Index 35.
IV E/VA/CO Terpolymer, 61% E, 29% VA, 10% CO
V CSPE, 35% Cl, 1% S, 56 Mooney Viscosity (100° C.).
VI E/MA/CO Terpolymer, 61.8% E, 27.9% MA, 10.3% CO, Melt Index 17
VIa E/MA/CO Terpolymer, 65% E, 26% MA, 9% CO, Melt Index 9.5
VII E/MA/CO Terpolymer, 64.3% E, 32.4% MA, 3.3% CO, Melt Index 0.11
VIII E/P/1,4-HD Terpolymer, 44% P, 4% 1,4-HD, 40 Mooney Viscosity (121° C.)
IX E/P/1,4-HD Terpolymer, 32% P, 6% 1,4-HD, 60 Mooney Viscosity (121° C.)

EXAMPLES 1 AND 2

The elastomer blends shown in Table 1, below, were prepared by melt blending using a Brabender "Plasticord" equipped with a set of roller blades (C. W. Brabender Instrument Inc., 50 East Wesley Street, South Hackensack, N.J. 07606). A batch size of approximately 50 g was used. It was known that Terpolymer IV can be crosslinked at 150° C. by the system used. A control experiment showed that Copolymer I was not cured in five minutes under those conditions since the gel content was very small, as can be seen in Table I. The "Plasticord" control was set at 150° C. and 40 rpm. The component elastomers were added into the mixing chamber first and then the crosslinking agent and MgO. After all the components were added, the rotational speed of the blades was increased to 75 rpm. The blend was removed from the mixer after five minutes of mixing at 75 rpm.

Gel contact for samples in Examples 1 and 2 was greater than that observed in the control experiment and was proportional to the amount of E/VA/CO polymers present in the blend.

The resultant blends (Examples 1 and 2) could be milled and showed improved processing behavior at 100° C. as indicated by the greater melt viscosity and lower die swell of extrudates.

TABLE 1

| Example No. | Parts | | |
|---|---|---|---|
| | Control | 1 | 2 |
| E/VA Copolymer I | 100 | 70 | 50 |
| E/VA/CO Terpolymer IV | | 30 | 50 |
| HMDAC, | 1.25 | 1.25 | 1.25 |
| MgO | 2 | 2 | 2 |
| mole of HMDAC/kg of Terpolymer IV | | 0.25 | 0.15 |
| Gel content (%) | 3 | 28 | 48 |
| Apparent Viscosity (kPa · s) | 63 | 146 | 257 |
| Die swell (%) | 32 | 8 | 12 |

EXAMPLES 3–5

The polymer blends shown in Table 2 were prepared by melt blending using a Brabender "Prep Center" equipped with a set of sigma blades. The batch size was approximately 250 grams. It is known that Terpolymer IV can be crosslinked at 150° C. by the systems used. The control experiment shown in Table 2 also demonstrated that Copolymer I and Terpolymer IV were not cured in 10 minutes under these conditions when HMDAC or sulfur curing agents were absent, since the observed gel content of the blend was found to be very small. The "Prep Center" controls were set at 150° C. and 20 rpm. The component elastomers were added into the mixing chamber first, and then the rest of the ingredients including the crosslinking system. After all the ingredients were added, the rotational speed of the blades was increased to 75 rpm. The blend was removed from the mixer after 10 minutes of mixing at 75 rpm.

Gel contents for samples in Examples 3, 4 and 5 were greater than those observed in the control and increased with increasing amount of HMDAC. The blends could be milled and showed improved processing behaviors at 100° C. as indicated by the greater melt viscosity and lower die swell of extrudates.

TABLE 2

| Example No. | Parts | | | | |
|---|---|---|---|---|---|
| | Control | 3 | 4 | 5 | 5a | 5b |
| E/VA Copolymer I | 50 | 50 | 50 | 50 | | |
| E/VA Copolymer Ib | | | | | 50 | 50 |
| E/VA/CO Terpolymer IV | 50 | 50 | 50 | 50 | 50 | 50 |
| HMDAC | 0 | 0.31 | 1.25 | 1.25 | | |
| MgO | 2 | 2 | 2 | — | 4 | 4 |
| DOTG | | | | 4.0 | 0.75 | 0.75 |
| Sulfur | | | | | 1 | 1 |
| moles HMDAC/kg of Terpolymer IV | 0.04 | 0.15 | 0.15 | | | |
| parts of sulfur per 100 parts of Terpolymer IV | | | | | 2 | 2 |
| Polygard[1] | | | | | 1 | 1 |
| Santowhite Powder[2] | | | | | 1 | 1 |
| Mercapto 2-benzothiazolyl disulfide | | | | | 1.75 | — |
| Ethyl thiuram disulfide | | | | | — | 1.75 |
| Gel content (%) | 2 | 35 | 51 | 48 | | |
| Apparent Viscosity (kPa · s) | 30 | 132 | 213 | | | |
| Die swell (%) | 30 | 8 | 3 | | | |

[1]Phosphate antioxidant, Uniroyal
[2]Phenolic antioxidant, Monsanto

EXAMPLE 6

A chlorosulfonated polyethylene compound was prepared as follows:

| | Parts |
|---|---|
| CSPE | 80 |
| A 90% dispersion of PbO in an EPDM rubber | 22 |
| MgO | 10 |
| SRF black | 30 |
| MT black | 120 |
| CaCO3 whiting | 20 |
| "Sundex" process oil | 60 |
| Dioctyl phthalate | 10 |
| Petrolatum | 2 |

In the control experiment, this compound was blended with additional CSPE; in Examples 6, 6a, and 6b it was blended, respectively, with the blends of Examples 5, 5a, and 5b. This was done in each case at room temperature by mill mixing for 10 minutes. The collapse resistance of the blends of Examples 6, 6a, and 6b at 93° C. was considerably better than that of the control experiment, as can be seen from Table 3, below.

TABLE 3

| Example No. | Parts | | | |
|---|---|---|---|---|
| | Control | 6 | 6a | 6b |
| CSPE compound | 354 | 354 | 354 | 354 |
| CSPE | 20 | 0 | 0 | 0 |
| Blend of Example 5 | | 20 | | |
| Blend of Example 5a | | | 20 | |
| Blend of Example 5b | | | | 20 |
| Collapse resistance (%) | 14 | 74 | 64 | 63 |

EXAMPLES 7a AND 7b

The polymer blend of Example 7a shown in Table 4 was prepared by melt blending using a Brabender "Plasticord" equipped with a set of roller blades. The batch size was approximately 50 grams. It is known that Terpolymer III can be crosslinked at 150° C. by the HMDAC/DOTG crosslinking system, but Terpolymer VIII will not be cured under the same conditions. The "Plasticord" controls were set at 150° C. and 40 rpm. The component elastomers were added into the mixing chamber first, and then the rest of the ingredients. The rotational speed of the blades was then increased to 75 rpm, and the blend was removed from the mixer 5 minutes later.

The polymer blend of Examples 7a was then mill blended at room temperature with an EPDM compound. The resultant blend (Example 7b) could be milled and showed improved collapse resistance over the EPDM control. The experimental details and test results are shown in table 4, below.

TABLE 4

| Example No. | Parts | | |
|---|---|---|---|
| | 7a | 7b | Control |
| EPDM Compound* | | 286 | 286 |
| EPDM Terpolymer VIII | 85 | | 0 |
| EPDM Terpolymer IX | | | 20 |
| E/VA/CO Terpolymer III | 15 | | |
| HMDAC | 0.1 | | |
| DOTG | 0.4 | | |
| moles of HMDAC/kg of Terpolymer III | 0.42 | | |
| Blend of Example (7a) | | 20 | |
| Collapse Resistance (%) | | 75% | 69% |
| *EPDM Polymer IX | 80 | | |
| FEF Carbon Black | 15 | | |
| SRF Carbon Black | 85 | | |
| Process Oil ("Sunpar" 2280) | 50 | | |
| Clay (Atomite Whiting) | 50 | | |
| ZnO | 5 | | |
| Stearic Acid | 1 | | |

EXAMPLES 8a AND 8b

The polymer blend shown in Example 8a was prepared by melt blending using a Brabender Plasticord equipped with a set of roller blades. The batch size was approximately 50 grams. It is known that Terpolymer VIa can be crosslinked at 150° C. by the crosslinking system used, but under the same conditions, Copolymer Ia cannot be crosslinked. The Plasticord controls were set at 150° C. and 40 rpm. The blend components were added into the mixing chamber in the same manner as in Examples 7 and 7a; then the rotational speed of the blades was increased to 75 rpm, and the blend was removed from the mixer 5 minutes later.

Polymer blend in Example 8a was then mill blended at room temperature with a chlorosulfonated polyethylene elastomer compound. The resultant blend (Example 8b) could be milled and showed improved processing behavior at 100° C. as indicated by its greater collapse resistance. The experimental details and results are shown in Table 5.

TABLE 5

| Example No. | Parts | | |
|---|---|---|---|
| | 8a | 8b | Control |
| CSPE Compound* | | 189 | 189 |
| E/VA Copolymer Ia | 50 | | |
| E/MA/CO Terpolymer VIa | 50 | | |
| DOTG | 1 | | |
| HMDAC | 0.5 | | |
| moles of HMDAC/kg of Terpolymer VIa | 0.12 | | |
| Blend of Example 8a | | 20 | |
| Collapse Resistance (%) | | 60 | 14 |

*See Example 6

EXAMPLE 9

The blends shown in Table 6, below, were prepared by mixing on a 15-cm diameter two-roll mill at a stock temperature of 100° C. for 10 minutes. It is known that Terpolymer IV can be crosslinked at 100° C. by the curing system used. The control experiment also demonstrated that Terpolymer II was not cured in 10 minutes under the same conditions because the gel content was found to be zero. The batch size was 200 grams.

Samples prepared in Examples 9a and 9b showed that the gel content increased with the E/VA/CO content in the blend while that of the control had no gel at all.

The resultant blends in Examples 9a and 9b could be milled and showed improved processing behavior at 100° C. as indicated by the greater apparent viscosity than the control. The blend of Example 9b also had a much lower die swell, while the blend of Example 9a had a slightly higher die swell than the control.

Note that the amount of gel was greater in both Examples than the amount of E/VA/CO terpolymer. In other words, some of the elastomer (E), as defined in the Summary of the Invention, was also crosslinked in the process, but the blends were still processable. In Example 9a the amount of the E/MA/MAME Terpolymer II which underwent crosslinking was about 13%, while in Example 9b that amount was about 17% of the total Terpolymer II present in the blend. The experimental details and results are shown in Table 6.

TABLE 6

| | Parts | | |
|---|---|---|---|
| Example No. | Control | 9a | 9b |
| E/MA/MAME Terpolymer II | 100 | 90 | 70 |
| E/VA/CO Terpolymer IV | 0 | 10 | 30 |
| HMDAC | 1.25 | 1.25 | 1.25 |
| DOTG | 4.0 | 4.0 | 4.0 |
| moles of HMDAC/kg of Terpolymer IV | | 0.78 | 0.26 |
| Gel content (%) | 0 | 22 | 42 |
| Apparent Viscosity (kPa · s) | 112 | 167 | 223 |
| Die swell (%) | 56 | 64 | 12 |

The gel content of Terpolymer II was calculated as follows:

Example 9a: $\frac{22 - 10}{90} \times 100 = 13\%$;

Example 9b: $\frac{42 - 30}{70} \times 100 = 17\%$.

EXAMPLES 10–14

Samples shown in Table 7 were prepared by mill mixing on a 15.2 cm mill at approximately 60° C. stock temperature for about 10 min. The conditions were chosen because it was known that milling in the presence of the crosslinking system used at 60° C. stock temperature would not crosslink Terpolymer II, when used alone, but would crosslink each of Terpolymers IV, VI and VII. The batch size was approximately 200 grams.

Collapse resistances of the blends of these Examples were significantly increased as compared with the control. Mooney viscosities of the compounds were also increased as compared with the control. Although the gel contents of these blends were not determined, they were estimated to be in all cases well below 70%.

The compounds were press-cured for 15 or 20 minutes at 177° C. to elastomers having good tensile properties at room temperature as shown in Table 7.

TABLE 7

| | Example, parts | | | | | |
|---|---|---|---|---|---|---|
| Compound Recipes | Control | 10 | 11 | 12 | 13 | 14 |
| E/MA/MAME Terpolymer II | 100 | 99 | 95 | 90 | 80 | 95 |
| E/VA/CO Terpolymer IV | — | 1 | — | — | — | 5 |
| E/MA/CO Terpolymer VI | — | — | 5 | 10 | — | — |
| E/MA/CO Terpolymer VII | — | — | — | — | 20 | — |
| "Naugard" 445 | 1 | 1 | 1 | 1 | 1 | 1 |
| Tri(nonylphenyl)phosphate | 1 | 1 | 1 | 1 | 1 | 1 |
| "Carbowax" 4000 | 2 | 2 | 2 | 2 | 2 | 2 |
| SRF Black | 20 | 20 | 20 | 20 | 20 | 20 |
| FEF Black | 50 | 50 | 50 | 50 | 20 | 50 |
| "Santicizer" 409 | 10 | 10 | 10 | 10 | 10 | 10 |
| Dioctyl Sebacate | 10 | 10 | 10 | 10 | 10 | 10 |
| Octadecylamine | 0.5 | 0.5 | 0.5 | 0.5 | 0.5 | 0.5 |
| Stearic Acid | 2 | 2 | 2 | 2 | 2 | 2 |
| Decyl acid phosphate | 2 | 2 | 2 | 2 | 2 | 2 |
| DOTG | 4 | 4 | 4 | 4 | 4 | 4 |
| HMDAC | 1.25 | 1.25 | 1.25 | 1.25 | 1.25 | 1.24 |
| moles of HMDAC/kg of Terpolymer IV, VI, or VII | | 7.8 | 1.6 | 0.78 | 0.40 | 1.56 |
| Mooney Visc. at 100° C. ML-4 | 13 | 18 | 18 | 25 | 18.5 | 20.5 |
| Collapse Resistance at 93° C., % | 37 | 67 | 54 | 62 | 65 | 92 |
| Tensile properties after crosslinking at 177° C. | | | | | | |
| Press heating time | 20 | 20 | 15 | 15 | 15 | 20 |
| 100% modulus (MPa) | 2.6 | 3.8 | 2.5 | 3.6 | 3.8 | 3.9 |
| Tensile strength (MPa) | 12.5 | 13.5 | 11.3 | 12.8 | 8.2 | 13.1 |
| Elongation (%) | 410 | 350 | 340 | 300 | 290 | 300 |

EXAMPLES 15 AND 16

The compounds shown in Table 8 were mixed on a 30 cm mill for about 15 minutes at a stock temperature of about 60° C.

Examples 15 and 16 showed acceptable Mooney scorch times (minutes to 10 point rise), but the minimum value, an indication of melt viscosity, was significantly increased. The compounds were subsequently cured for 20 minutes at 177° C. to elastomers having good tensile properties at room temperature as shown in Table 8.

TABLE 8

| | Parts | | |
|---|---|---|---|
| Example No. | Control | 15 | 16 |
| E/MA/MAME Terpolymer II | 100 | 50 | 50 |
| E/VA/CO Terpolymer IV | — | 50 | 50 |
| "Naugard" 445 | 1 | 1 | 1 |
| Tri(nonylphenyl)phosphate, parts | 1 | 1 | 1 |
| FEF Black | 50 | 50 | 50 |
| Octadecylamine | 0.5 | 0.5 | 0.5 |
| Stearic Acid | 2 | 2 | 2 |
| DOTG | 4 | 4 | 4 |
| HMDAC | 1.25 | 1.25 | — |
| MDA | — | — | 1.25 |
| moles of HMDAC/kg of Terpolymer IV | | 0.15 | 0.15 |
| Mooney Scorch at 121° C. | | | |
| Minimum | 18 | 125 | 63 |
| Minutes to 10 pt rise | 11 | 6 | 24 |
| Tensile properties after curing 20 mins at 177° C. | | | |
| Modulus at 100% (MPa) | 3.4 | 7.6 | 7.8 |
| Tensile Strength (MPa) | 16.7 | 13.8 | 18.1 |
| Elongation at Break (%) | 360 | 180 | 210 |

We claim:

1. A process for improving the processability of an uncured, soft elastomer (E), wherein elastomer (E), 30–99 parts by weight, is blended with a composition selected from the class of compositions (1) and (2), wherein
   (1) is a mixture, which may be prepared in situ, of uncrosslinked polymer (T), which is a copolymer of ethylene with carbon monoxide and with at least one ethylenically unsaturated monomer X selected from the class consisting of $C_3$–$C_{20}$ $\alpha,\beta$-unsaturated mono- and dicarboxylic acids, $C_1$–$C_{18}$ alkyl esters of $\alpha,\beta$-unsaturated $C_3$–$C_{20}$ mono- and dicarboxylic acids, vinyl esters of $C_1$–$C_{18}$ saturated carboxylic acids, vinyl $C_1$–$C_{18}$ alkyl ethers, acrylonitrile, and methacrylonitrile
   with an effective amount of a crosslinking agent for polymer (T), which does not substantially cure elastomer (E);
   the total amount of polymer (T) plus crosslinking agent being about 1–70 parts by weight; and
   (2) is a blend of polymer (T) with an effective amount of a crosslinking agent for polymer (T) and with soft elastomer ($E_1$), which is not substantially curable by the crosslinking agent for polymer (T), and which may be the same as elastomer (E); the amount of elastomer ($E_1$) being about 30–99 weight percent of the blend, and the amount of polymer (T) plus crosslinking agent being about 1–70 weight percent, said blend having been prepared under shear conditions, the amount of shear and the temperature being such that the resulting blend has a gel content of about 1–70%, and the gel forms a dispersed phase in a sol matrix;
   the amount of blend (2) being about 1–70 parts by weight;
   with the proviso that blending of elastomer (E) with composition (1) is carried out under shear conditions, the amount of shear and the temperature being such that the resulting blend has a gel content of about 1–70%, and the gel forms a dispersed phase in a sol matrix.

2. A process of claim 1 wherein elastomer (E) is not substantially curable by a primary diamine under the blending conditions; the composition containing uncured polymer (T) is composition (1); and the crosslinking agent is a primary diamine, a primary diamine salt, or a primary diamine precursor.

3. A process of claim 2 wherein elastomer (E) is selected from the class consisting of ethylene/methyl acrylate copolymers, ethylene/vinyl acetate copolymers, and ethylene/methyl acrylate/monoethyl maleate terpolymers.

4. A process of claim 3 wherein polymer (T) is an ethylene/vinyl acetate/carbon monoxide terpolymer or ethylene/methyl acrylate/carbon monoxide terpolymer.

5. A process of claim 1 wherein polymer (T) is an ethylene/vinyl acetate/carbon monoxide terpolymer, and the cross-linking agent is elemental sulfur or a sulfur donor.

6. A process of claim 1 wherein elastomer (E) is chlorosulfonated polyethylene; the composition containing uncured polymer (T) is composition (2); and the crosslinking agent is a primary diamine, a primary diamine salt, or a primary diamine precursor.

7. A process of claim 6 wherein polymer (T) is an ethylene/vinyl acetate/carbon monoxide terpolymer or ethylene/methyl acrylate/carbon monoxide terpolymer, and elastomer ($E_1$) in composition (2) is an EPDM rubber.

8. A process of claim 1 wherein the crosslinking agent is a primary diamine, a primary diamine salt, or a primary diamine precursor and it's amount is about 0.01–20 moles/kg of polymer (T).

9. A process of claim 8 wherein the amount of crosslinking agent is about 0.02–8 moles/kg of polymer (T).

10. A process of claim 9 wherein the amount of crosslinking agent is about 0.1–2 moles/kg of polymer (T).

11. A process of claim 1 wherein polymer (T) is a terpolymer of ethylene, vinyl acetate, and carbon monoxide; the cross-linking agent is sulfur, its amount being at least about 0.5 part by weight per 100 parts by weight of polymer (T), and an accelerator is present in an amount of at least about 0.25 part by weight per 100 parts by weight of polymer (T).

12. A process of claim 1 wherein polymer (T) is a terpolymer of ethylene, vinyl acetate, and carbon monoxide, and the amount of polymer (T) is about 5–50% by weight of the elastomer blend.

13. A process of claim 1 which is carried out at a temperature of about 30°–200° C.

14. A process of claim 13 which is carried out at a temperature of 100°–150° C.

15. A process of claim 14 which is carried out at a temperature below about 120° C.

16. An elastomeric composition obtained by blending an uncured, soft elastomer (E), 30–99 parts by weight, with a composition selected from the class of compositions (1) and (2), wherein
   (1) is a mixture, which may be prepared in situ, of uncrosslinked polymer (T), which is a copolymer of ethylene with carbon monoxide and with at least one ethylenically unsaturated monomer X selected from the class consisting of $\alpha,\beta$-unsaturated $C_3$–$C_{20}$ mono- and dicarboxylic acids, $C_1$–$C_{18}$ alkyl esters of $\alpha,\beta$-unsaturated $C_3$–$C_{20}$ mono- and dicarboxylic acids, vinyl esters of $C_1$–$C_{18}$ saturated carboxylic acids, vinyl $C_1$–$C_{18}$ alkyl ethers, acrylonitrile, and methacrylonitrile
   with an effective amount of a crosslinking agent for polymer (T), which does not substantially cure elastomer (E);
   the total amount of polymer (T) plus crosslinking agent being about 1–70 parts by weight; and
   (2) is a blend of polymer (T) with an effective amount of a crosslinking agent for polymer (T) and with soft elastomer ($E_1$), which is not substantially curable by the crosslinking agent for polymer (T), and which may be the same as elastomer (E); the amount of elastomer ($E_1$) being about 30–99 weight percent of the blend, and the amount of polymer (T) plus crosslinking agent being about 1–70 weight percent, said blend having been prepared under shear conditions, the amount of shear and the temperature being such that the resulting blend has a gel content of about 1–70%, and the gel forms a dispersed phase in a sol matrix;
   the amount of blend (2) being about 1–70 parts by weight;
   with the proviso that blending of elastomer (E) with composition (1) is carried out under shear conditions, the amount of shear and the temperature being such that the resulting elastomer blend has a gel content of about 1–70%, and the gel forms a dispersed phase in a sol matrix.

17. A composition of claim 16 wherein elastomer (E) is not substantially curable by a primary diamine under the blending conditions; the composition containing uncrosslinked polymer (T) is composition (1); and the crosslinking agent is a primary diamine, a primary diamine salt, or a primary diamine precursor.

18. A composition of claim 17 wherein elastomer (E) is selected from the class consisting of ethylene/methyl acrylate/copolymers, ethylene/vinyl acetate copolymers, and ethylene/methyl acrylate/terpolymers.

19. A composition of claim 18 wherein polymer (T) is an ethylene/vinyl acetate/carbon monoxide terpolymer or ethylene/methyl acrylate/carbon monoxide terpolymer.

20. A composition of claim 16 wherein polymer (T) is an ethylene/vinyl acetate/carbon monoxide, and the cross-linking agent is sulfur or a sulfur donor.

21. A composition of claim 16 wherein elastomer (E) is chlorosulfonated polyethylene, the composition containing uncured polymer (T) is composition (2); and the crosslinking agent is a primary diamine, a primary diamine salt, or a primary diamine precursor.

22. A composition of claim 21 wherein polymer (T) is an ethylene/vinyl acetate/carbon monoxide terpolymer or ethylene/methyl acrylate/carbon monoxide terpolymer, and elastomer ($E_1$) in composition (2) is an EPDM rubber.

23. A composition of claim 15 wherein the crosslinking agent is a primary diamine, a primary diamine salt, or a primary diamine precursor, and its amount is about 0.01–20 moles/kg of polymer (T).

24. A composition of claim 23 wherein the amount of crosslinking agent is about 0.02–8 moles/kg of polymer (T).

25. A composition of claim 24 wherein the amount of crosslinking agent is about 0.1–2 moles/kg of polymer (T).

26. A composition of claim 16 wherein polymer (T) is an ethylene/vinyl acetate/carbon monoxide terpolymer, and the cross-linking agent is sulfur, its amount being at least about 0.5 part per 100 parts by weight of polymer (T), an accelerator being present in an amount of at least about 0.25 part per 100 parts by weight of polymer (T).

* * * * *